United States Patent
Hirabayashi et al.

(10) Patent No.: US 8,373,806 B2
(45) Date of Patent: Feb. 12, 2013

(54) ELECTRO-OPTICAL DEVICE AND ELECTRONIC APPARATUS

(75) Inventors: Hidekazu Hirabayashi, Shiojiri (JP); Tomoaki Miyashita, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 240 days.

(21) Appl. No.: 13/012,205

(22) Filed: Jan. 24, 2011

(65) Prior Publication Data

US 2011/0194037 A1 Aug. 11, 2011

(30) Foreign Application Priority Data

Feb. 8, 2010 (JP) ................................ 2010-025177

(51) Int. Cl.
- *G02F 1/1335* (2006.01)
- *G02F 1/1333* (2006.01)
- *G09F 13/08* (2006.01)

(52) U.S. Cl. ............... 349/5; 349/58; 349/59; 362/97.1; 362/97.4

(58) Field of Classification Search .................. 349/5, 7, 349/6, 8, 20, 21, 58, 72, 59, 95; 362/97.1, 362/97.2, 97.3, 97.4
See application file for complete search history.

(56) References Cited

U.S. PATENT DOCUMENTS

| | | | |
|---|---|---|---|
| 5,170,194 A | 12/1992 | Kurematsu et al. | |
| 6,069,677 A * | 5/2000 | Kitai | 349/111 |
| 6,108,060 A * | 8/2000 | Funamoto et al. | 349/65 |
| 6,414,781 B1 | 7/2002 | Saitoh | |
| 6,661,480 B2 * | 12/2003 | Fujishiro et al. | 362/600 |
| 6,693,682 B2 * | 2/2004 | Fujishiro et al. | 349/65 |
| 7,903,197 B2 * | 3/2011 | Koganezawa | 349/65 |
| 8,208,094 B2 * | 6/2012 | Koganezawa | 349/69 |
| 2003/0107698 A1 | 6/2003 | Nagayama et al. | |
| 2005/0264999 A1 | 12/2005 | Kalyandurg | |
| 2011/0194037 A1 * | 8/2011 | Hirabayashi et al. | 349/5 |

FOREIGN PATENT DOCUMENTS

JP 2003-177388 A 6/2003

OTHER PUBLICATIONS

European Search Report, Jun. 20, 2011, issued in related Patent Application No. EP-11151760.

* cited by examiner

*Primary Examiner* — Brian Healy
(74) *Attorney, Agent, or Firm* — AdvantEdge Law Group, LLC (57) ABSTRACT

In at least one embodiment of the disclosure, an electro-optical device includes an electro-optical panel including a display area. The electro-optical panel has an incidence face side that faces incident light from a light source and an opposite side which is opposite to the incidence face side. A holding member houses the electro-optical panel. A heat radiation member is provided at the opposite side of the electro-optical panel. A light-shielding plate is formed so as to at least partially surround the display area of the electro-optical panel. The light-shielding plate is provided so as to make contact with the holding member and the incidence face side of the electro-optical panel.

10 Claims, 8 Drawing Sheets

ELECTRO-OPTICAL DEVICE AND ELECTRONIC APPARATUS

CROSS-REFERENCE

The present application claims priority from Japanese Patent Application No. 2010-025177 filed on Feb. 8, 2010 which is hereby incorporated by reference in its entirety.

BACKGROUND

This type of electro-optical device is constituted by mounting or accommodating an electro-optical panel such as a liquid crystal panel, for example, in a mounting case and used as a light valve of, for example, a liquid crystal projector or the like. The mounting case is constituted, for example, by a frame member and a plate-like member and the electro-optical panel is housed by being covered in a picture frame shape from a peripheral border thereof by the frame member and also being placed on the plate-like member.

For example, in JP-A-2003-177388, an electro-optical panel is fixed so as to be covered by a frame member from a display face side, and also placed on a plate-like member from a back face side. In the frame member, an opening portion is provided in a window shape such that a display area of the electro-optical panel is exposed, and the electro-optical panel is held away from the display face side by a portion provided so as to extend up to an edge portion of the opening portion in the frame member.

In JP-A-2003-177388 described above, since the portion formed so as to extend up to the edge portion of the opening portion in the frame is formed integrally with a frame main body, flexibility is lacking. For this reason, the device has a structure in which, for example, when the device generates heat due to irradiation of light-source light to the display area of the electro-optical panel, stress is easily generated in the inside of the device and this stress is easily transmitted to the electro-optical panel. Therefore, there is a technical problem in which the gap between the substrates of the electro-optical panel is displaced by the stress, so that color unevenness occurs in a display image, whereby the image quality of the display image is deteriorated. Also, in such an electro-optical device, when the device is attached to an electronic apparatus such as a liquid crystal projector, a mounting case is sometimes attached to a wall surface or the like of the electronic apparatus by bolts or the like. Also in such a case, there is a technical problem in which stress is generated by tightening the bolts and this stress is transmitted to the electro-optical panel, so that color unevenness occurs in a display image in the same way.

SUMMARY

In accordance with certain embodiments of the disclosure, it is possible to provide an electro-optical device in which stress which is generated in the inside of the device is suppressed, so that high-definition image display with less color unevenness is possible, and an electronic apparatus is provided with the electro-optical device.

According to a first aspect of the disclosure, there is provided an electro-optical device including: an electro-optical panel; a holding member which houses the electro-optical panel; a heat radiation member provided at the opposite side to an incidence face of the electro-optical panel; and a light-shielding plate provided so as to come into contact with the holding member and the electro-optical panel from the incidence face side of the electro-optical panel and formed so as to at least partially surround a display area of the electro-optical panel.

The electro-optical panel related to an aspect of the disclosure displays an image by transmitting or reflecting light-source light, which is illuminated from, for example, a white color lamp or the like, in the display area. For example, in the case of a reflection type electro-optical panel, an image is displayed, for example, by modulating light entered into the display area in a pixel unit and then reflecting it by a reflective film such as an Al (aluminum) film. In the display area, for example, a plurality of pixels is disposed in a matrix form and respectively electrically connected to a scanning line supplying a scanning signal and a data line supplying an image signal. Each pixel controls an orientation state of an electro-optical material such as a liquid crystal disposed to face it, in accordance with an electric potential of the image signal.

The holding member related to an aspect of the disclosure houses the electro-optical panel. In at least one embodiment the holding member is formed so as to have, for example, a frame-like opening portion formed to be wider than the display area of the electro-optical panel. In this case, the holding member at least partially defines a window for holding the electro-optical panel and also allowing incident light to enter.

The heat radiation member related to an aspect of the disclosure is provided at the opposite side to the incidence face of the electro-optical panel. For example, in one embodiment, the heat radiation member is bonded to the electro-optical panel by an adhesive agent or the like. The heat radiation member can radiate heat which is generated in the electro-optical panel due to intense light from a light source. In an embodiment of the disclosure the heat radiation member is provided at the opposite side to a light-source light incidence face so as not to interfere with an optical path of the incident light related to the image display. The heat radiation member is formed by a metal material such as aluminum (Al) or copper (Cu), for example. Therefore, it is possible to perform heat radiation by efficiently conducting heat, which is generated in the electro-optical panel, in the heat radiation member. Such improvement in a heat radiation property leads to an effect which suppresses the generation of stress caused by the strain of a constituent member of the electro-optical device, such as the holding member, due to the generation of heat. Therefore, stress which is transmitted to the electro-optical panel can also be reduced, so that high-definition image display with less color unevenness can be realized.

The light-shielding plate related to an aspect of the disclosure is, for example, a parting plate formed so as to at least partially surround the display area of the electro-optical panel. In at least one embodiment, a material having low light reflectivity compared to a member (for example, the holding member or the like), which is disposed around the light-shielding plate, is used as the material for the light-shielding plate.

In an aspect of the disclosure the light-shielding plate is provided so as to come into contact with the holding member and the electro-optical panel from the incidence face side of the electro-optical panel. Also, the heat radiation member is provided so as to come into contact with the holding member and the electro-optical panel from a face side opposite to the incidence face. That is, the electro-optical panel is disposed so as to be held by the holding member from the side face side thereof and also sandwiched between the light-shielding plate and the heat radiation member from the up-and-down direction side. That is, instead of being fixed solely by a holding member as in the related art, since the electro-optical panel is sandwiched between the light-shielding plate and the heat radiation member, it is difficult for stress generated in a member (for example, the holding member, the light-shielding plate, the heat radiation member, or the like) other than the electro-optical panel to be transmitted to the electro-optical panel. That is, since the electro-optical panel is held by being sandwiched between a plurality of members (that is, the light-shielding plate and the heat radiation member), stress is dispersed by these members, and is thereby reduced.

Also, since the holding member comes into direct or indirect (for example, through an adhesive agent or the like) contact with the heat radiation member, for example, at the peripheral border side of the electro-optical panel, it is possible to dissipate the heat of the electro-optical panel from the peripheral border side of the electro-optical panel to the outside by the holding member and also dissipate the heat conducted from the electro-optical panel to the holding member to the outside by the heat radiation member, so that it is possible to further improve the heat radiation property of the electro-optical panel. As described above, improvement in the heat radiation property can contribute to reduction in stress in the constituent member of the electro-optical device due to generation of heat, so that color unevenness in the display image of the electro-optical panel can be suppressed.

As described above, in an aspect of the disclosure, since it is possible to reduce stress which is applied to the electro-optical panel, it is possible to effectively reduce color unevenness in the display image of the electro-optical panel.

In one aspect of the electro-optical device according to the disclosure, the holding member may include an attaching portion formed so as to protrude to a mounted member side compared to the light-shielding plate, and a concave portion provided so as to be concave compared to the attaching portion in the holding member, and the light-shielding plate may be disposed so as to come into contact with the concave portion.

According to this aspect, the holding member which holds the electro-optical panel may have an attaching portion and a concave portion.

The attaching portion is formed so as to protrude further to the mounted member side than to the light-shielding plate. Here, the mounted member can adopt various aspects regardless of the physical, mechanical, or electrical configuration thereof without being limited as long as it is an external member which is a target, to which the electro-optical device is attached. For example, in a case where the electro-optical device is used as a light valve which is attached to an electronic apparatus such as a liquid crystal projector, the mounted member is a fixing jig for fixing the light valve to the liquid crystal projector.

In at least one embodiment, the attaching portion is attached to the mounted member by, for example, bolts or the like. In this case, when the bolts are tightened, strains are generated in the attaching portion and the mounted member, with which the bolts come into contact, so that stress is easily generated. However, as described above, since the electro-optical panel is disposed so as to be sandwiched between the light-shielding plate and the heat radiation member, it is difficult for stress generated in this manner to be transmitted to the electro-optical panel. In this aspect, even in a case where the holding member is tightened by bolts in this manner, since stress can be reduced, color unevenness in the display image of the electro-optical panel can be effectively suppressed.

The concave portion is provided so as to be concave compared to the attaching portion in the holding member. As described above, since the attaching portion protrudes further to the mounted member side than the light-shielding plate, when the holding member has been attached to the mounted member, only the attaching portion of the holding member comes into contact with the mounted member. Therefore, at the time of attachment to the mounted member, the concave portion does not come into contact with the mounted member. For this reason, a structural margin is present on the surface of the concave portion. In this aspect, by disposing the light-shielding plate in such a margin, it is possible to realize the electro-optical device according to the disclosure in an efficient layout.

In another aspect of the electro-optical device according to the disclosure, the electro-optical device may include a hook member which fixes the heat radiation member to the holding member from the opposite side to the face of the heat radiation member, which faces the electro-optical panel.

According to this aspect, the heat radiation member is fixed to the holding member by the hook member. For example, in a case where the heat radiation member is fixed to the holding member by bolts or the like, there is a fear that great stress will be generated when tightening the bolts. On the other hand, in this aspect, since it is possible to perform fixing by hooking the hook member, for example, on protrusion portions formed at the holding member, stress which is generated at the time of the fixing is minor. That is, by performing the fixing by the hook member, it is difficult for strain to be generated in the heat radiation member or the holding member, so that generation of stress can be effectively prevented.

Also, since the hook member is provided at the opposite side to the face side of the heat radiation member, which faces the electro-optical panel, the light-source light which is illuminated to the display area of the electro-optical panel is not blocked. For this reason, it is possible to fix the heat radiation member to the holding member in an efficient layout without interfering with the display of the electro-optical panel.

In still another aspect of the electro-optical device according to the disclosure, an opening portion of the light-shielding plate may be formed inside an opening portion of the holding member as viewed from the incidence face side.

In this aspect, an opening portion which is defined by the light-shielding plate formed so as to at least partially surround the display area of the electro-optical panel is formed so as to be narrow compared to an opening portion which is defined by the holding member which holds the electro-optical panel by surrounding it from the side face side. That is, the light-shielding plate is disposed so as to protrude toward the inside of the opening portion of the holding member, and the protruded portion comes into direct or indirect (for example, through an adhesive agent or the like) contact with the electro-optical panel, thereby holding the electro-optical panel so as to sandwich the electro-optical panel between the portion and the heat radiation member.

In another aspect of the electro-optical device according to the disclosure, the light-shielding plate may have elasticity.

The light-shielding plate is disposed so as to sandwich the electro-optical panel along with the heat radiation member, as described above. Here, since the light-shielding plate has elasticity, stress generated in the inside of the electro-optical device is absorbed by the light-shielding plate. For this reason, it is possible to effectively reduce stress being transmitted to the electro-optical panel.

In another aspect of the electro-optical device according to the disclosure, the heat radiation member may be formed integrally with the holding member.

According to this aspect, compared to a case where the heat radiation member and the holding member are formed as separate members, the degree of rigidity of the entire device is improved. For this reason, even in a case where stress is generated in the electro-optical device, compared to a case where the heat radiation member and the holding member are formed as separate members, it is possible to keep the stress thereof to a small magnitude. Therefore, stress which is transmitted to the electro-optical panel can also be reduced, so that color unevenness in the display image can be further suppressed.

According to another aspect of the disclosure, there is provided an electronic apparatus including the above-described electro-optical device (including the various aspects thereof).

According to this aspect, since the electronic apparatus is provided with the above-described electro-optical device, various electronic apparatuses such as a projection type display apparatus, a television, a mobile telephone, an electronic notebook, a word processor, a viewfinder type or a monitor direct view type video tape recorder, a workstation, a television telephone, a POS terminal, and a touch panel can be realized which can display a high-quality image with less color unevenness. Also, as an electronic apparatus according to the disclosure, an electrophoretic device such as electronic paper or the like may also be realized.

The operation and other advantages of the disclosure will be apparent from a configuration for carrying out the disclosure as described below.

BRIEF DESCRIPTION OF THE DRAWINGS

Non-limiting and non-exhaustive embodiments of the present disclosure will be described with reference to the accompanying drawings, wherein like numbers reference like elements.

DESCRIPTION OF EMBODIMENTS

In the following description, reference is made to the accompanying drawings which form a part hereof, and in which are shown, by way of illustration, specific embodiments in which the disclosure may be practiced. In the following embodiments, an electro-optical device which is provided with a reflection type liquid crystal panel of a TFT active matrix drive system, which is one example of an electro-optical panel, is shown as an example. It is to be understood, however, that other embodiments may be utilized and changes may be made without departing from the scope of the present disclosure. Therefore, the following detailed description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," "one," and "the" may include reference to both the singular and the plural. Reference in the specification to "one embodiment" or "an embodiment" means that a particular feature, structure, or characteristic described in connection with the embodiment may be included in at least one embodiment of the disclosure. The appearances of the phrases "in one embodiment" or "in an embodiment" in various places in the specification do not necessarily all refer to the same embodiment, but it may.

Several embodiments will sequentially be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment. Moreover, the scope of a disclosure under one section heading should not be construed to restrict or to limit the disclosure to that particular embodiment, rather the disclosure should indicate that a particular feature, structure, or characteristic described in connection with a section heading is included in at least one embodiment of the disclosure, but it may also be used in connection with other embodiments.

Electro-Optical Device

First Embodiment

Figure 1:
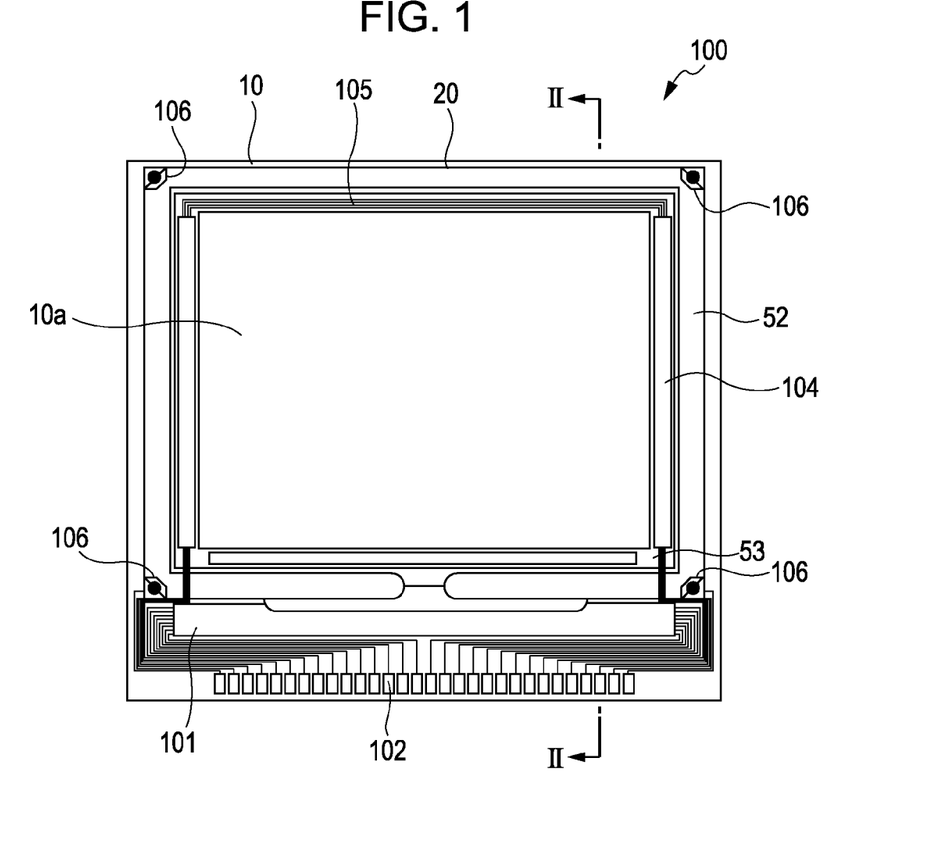
FIG. 1 is a plan view showing the overall configuration of a liquid crystal panel which is provided in an electro-optical device related to a first embodiment.
Figure 2:
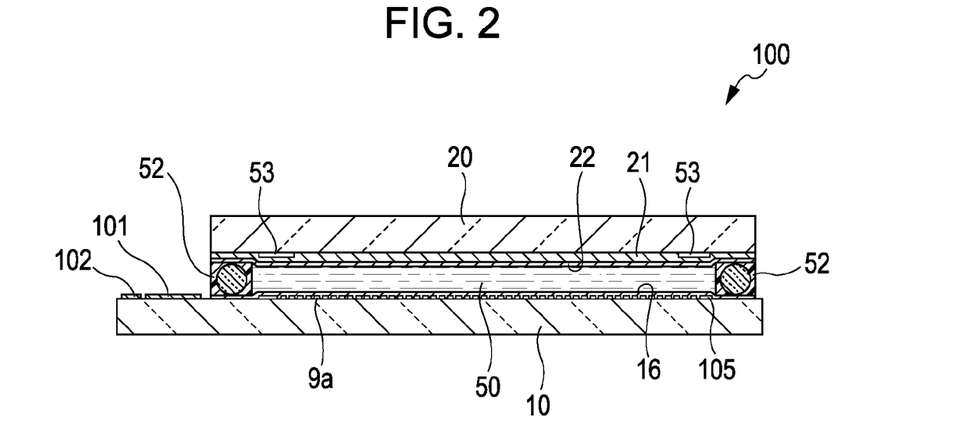
FIG. 2 is a cross-sectional view taken along line II-II of FIG. 1.

First, the overall configuration of a liquid crystal panel 100 which is provided in an electro-optical device related to this embodiment will be described with reference to FIGS. 1 and 2. FIG. 1 is a plan view showing the overall configuration of the liquid crystal panel 100 which is provided in the electro-optical device related to this embodiment. FIG. 2 is a cross-sectional view taken along line II-II of FIG. 1.

The liquid crystal panel 100 has a configuration in which a TFT array substrate 10 and a counter substrate 20 are disposed to face each other. The TFT array substrate 10 is composed of a transparent substrate such as a single-crystal silicon substrate, a glass substrate, or a quartz substrate, for example, and the counter substrate 20 is composed of a transparent substrate such as a glass substrate or a quartz substrate, for example. A liquid crystal layer 50 is enclosed between the TFT array substrate 10 and the counter substrate 20. The liquid crystal layer 50 is composed of a liquid crystal, in which, for example, a single kind or several kinds of nematic liquid crystals are mixed, and takes a predetermined orientation state between a pair of alignment films.

The TFT array substrate 10 and the counter substrate 20 are bonded to each other by a seal material 52 provided at a seal area which is located around an image display area 10a in which a plurality of pixel electrodes are provided.

The seal material 52 is a material for bonding both substrates, which is composed of, for example, ultraviolet curing resin, thermosetting resin, or the like and hardened by ultraviolet irradiation, heating, or the like after application onto the TFT array substrate 10 in a manufacturing process. Gap materials such as glass fibers or glass beads, which are for making the gap between the TFT array substrate 10 and the counter substrate 20 (that is, the gap between substrates) a predetermined value, are dispersed in the seal material 52. Also, the gap materials may be disposed at the image display area 10a or a peripheral area which is located around the image display area 10a, in addition to or in place of being mixed into the seal material 52. Also, the image display area 10a is one example of a "display area" related to the disclosure.

A frame light-shielding film 53 having a light blocking property, which partially defines a frame region of the image display area 10a, is provided at the counter substrate 20 side in parallel with the inside of the seal area in which the seal material 52 is disposed. The frame light-shielding film 53 provided at the counter substrate 20 side partially defines the image display area 10a.

In the peripheral area, in an area which is located outside the seal area in which the seal material 52 is disposed, a data line driving circuit 101 and an external circuit connection terminal 102 are provided along one side of the TFT array substrate 10. Scanning line driving circuits 104 are provided along two sides adjacent to the one side and so as to be covered by the frame light-shielding film 53. Also, in order to connect two scanning line driving circuits 104, which are provided at both sides of the image display area 10a in this manner, to each other, a plurality of wirings 105 is provided along the remaining one side of the TFT array substrate 10 and so as to be covered by the frame light-shielding film 53.

Upper and lower conduction terminals 106 for connecting both substrates to each other by upper and lower conduction materials 107 are provided at areas facing four corner portions of the counter substrate 20 on the TFT array substrate 10. Electrical conduction between the TFT array substrate 10 and the counter substrate 20 can be taken by these conduction terminals.

As shown in FIG. 2, a laminated structure, in which pixel switching TFTs that are driving elements, or wirings such as scanning lines and data lines are provided, is formed on the TFT array substrate 10. Although the detailed configuration of the laminated structure is not shown in FIG. 2, a reflection type pixel electrode 9a which serves as a reflective electrode is provided on the laminated structure. The pixel electrode 9a is typically formed in an island shape and in a predetermined pattern for each pixel by a material having high light reflectivity, such as aluminum, and reflects incident light.

The pixel electrode 9a is provided at the image display area 10a on the TFT array substrate 10 so as to face the counter electrode 21. An alignment film 16 is formed over the surface on a side facing the liquid crystal layer 50 in the TFT array substrate 10, that is, over the pixel electrode 9a so as to cover the pixel electrode 9a.

A counter electrode 21 which is composed of a transparent material such as an ITO is formed on the surface facing the TFT array substrate 10 in the counter substrate 20 so as to face a plurality of pixel electrodes 9a. Also, in order to perform color display in the image display area 10a, a color filter, which is not shown in FIG. 2, may be formed at an area including an opening area and a portion of a non-opening area. An alignment film 22 is formed on the counter electrode 21 over the surface of the counter substrate 20, which faces the TFT array substrate 10. Also, similarly to a transmission type liquid crystal device, a light-shielding film may be formed in a lattice shape or a stripe shape on the counter substrate 20, whereby a non-opening area may be provided.

Also, on the TFT array substrate 10 shown in FIGS. 1 and 2, in addition to the driving circuits such as the data line driving circuit 101 and the scanning line driving circuits 104 described above, a sampling circuit which samples and supplies an image signal on an image signal line to the data line, a precharge circuit which supplies a precharge signal of a predetermined voltage level to each of a plurality of data lines previous to the image signal, an inspection circuit for inspecting quality, defects, or the like of the liquid crystal panel 100 during manufacture or at the time of shipment, and the like may be formed.

Next, the electrical configuration of a pixel portion of the liquid crystal panel 100 related to this embodiment will be described with reference to FIG. 3. Here, FIG. 3 is an equivalent circuit diagram of various elements, wirings, and the like in a plurality of pixels formed in a matrix form, which constitutes the image display area 10a of the liquid crystal panel 100 which is provided in the electro-optical device related to this embodiment.

Figure 3:
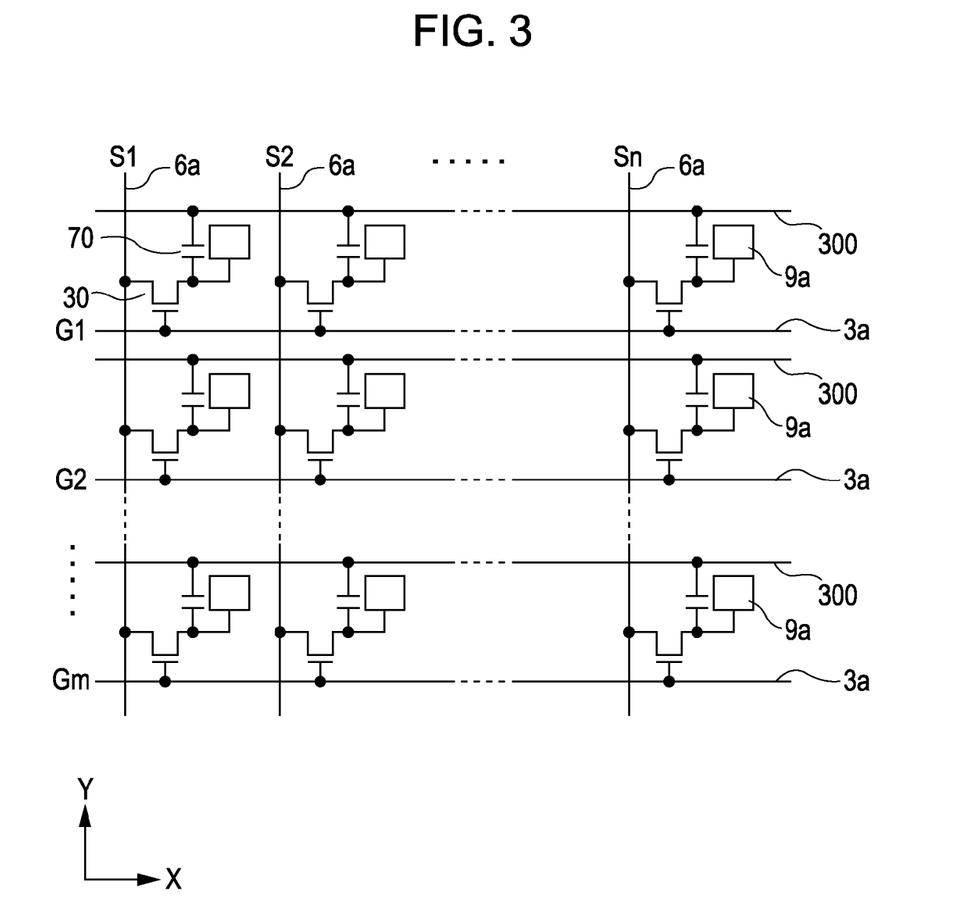
FIG. 3 is an equivalent circuit diagram of various elements, wirings, and the like in a plurality of pixels formed in a matrix form, which constitutes an image display area of the liquid crystal panel which is provided in the electro-optical device related to the first embodiment.

In FIG. 3, the pixel electrode 9a and a TFT 30 are formed at each of a plurality of pixels formed in a matrix form, which constitutes the image display area 10a. The TFT 30 is electrically connected to the pixel electrode 9a and controls the switching of the pixel electrode 9a at the time of an operation of the liquid crystal panel 100. A data line 6a, to which an image signal is supplied, is electrically connected to a source of the TFT 30. Image signals S1, S2, . . . , and Sn, which are written in the data lines 6a, may be line-sequentially supplied in this order or may also be supplied for each group with respect to a plurality of data lines 6a adjacent to each other.

A scanning line 3a is electrically connected to a gate of the TFT 30, and the liquid crystal panel 100 is configured so as to line-sequentially apply scanning signals G1, G2, . . . , and Gm in this order in a pulse manner to the scanning lines 3a at a predetermined timing. The pixel electrode 9a is electrically connected to a drain of the TFT 30, and by switching-on the TFT 30, which is a switching element, only for a certain period, the image signals S1, S2, . . . , and Sn, which are supplied from the data lines 6a, are written at a predetermined timing. The image signals S1, S2, . . . , and Sn of a predetermined level written to the liquid crystals through the pixel electrodes 9a are kept for a certain period between the pixel electrodes and the counter electrode formed on the counter substrate.

The liquid crystals constituting the liquid crystal layer 50 (refer to FIG. 2) modulate light by using a change in orientation or order of a molecular assembly by the voltage level which is applied, thereby enabling gradation display. For example, in the case of a normally-white mode, transmittance with respect to the incident light decreases depending on the voltage applied in each pixel unit, whereas in the case of a normally-black mode, transmittance with respect to the incident light increases depending on the voltage applied in each pixel unit, and as a whole, light having contrast according to the image signal is emitted from the liquid crystal panel 100.

Here, in order to prevent leakage of the held image signal, a storage capacitor 70 is added in parallel with a liquid crystal capacitance which is formed between the pixel electrode 9a and the counter electrode 21 (refer to FIG. 2). The storage capacitor 70 is a capacitive element functioning as a holding capacitor which temporarily holds an electric potential of each pixel electrode 9a in accordance with the supply of the image signal. An electrode of one side of the storage capacitor 70 is electrically connected to the drain of the TFT 30 in parallel with the pixel electrode 9a and an electrode of the other side is electrically connected to a capacitor line 300 of a fixed electric potential so as to have a constant electric potential. Due to the storage capacitor 70, a potential retention characteristic in the pixel electrode 9a is improved, so that improvement in display properties such as improvement in contrast or reduction in flicker becomes possible.

Figure 4:
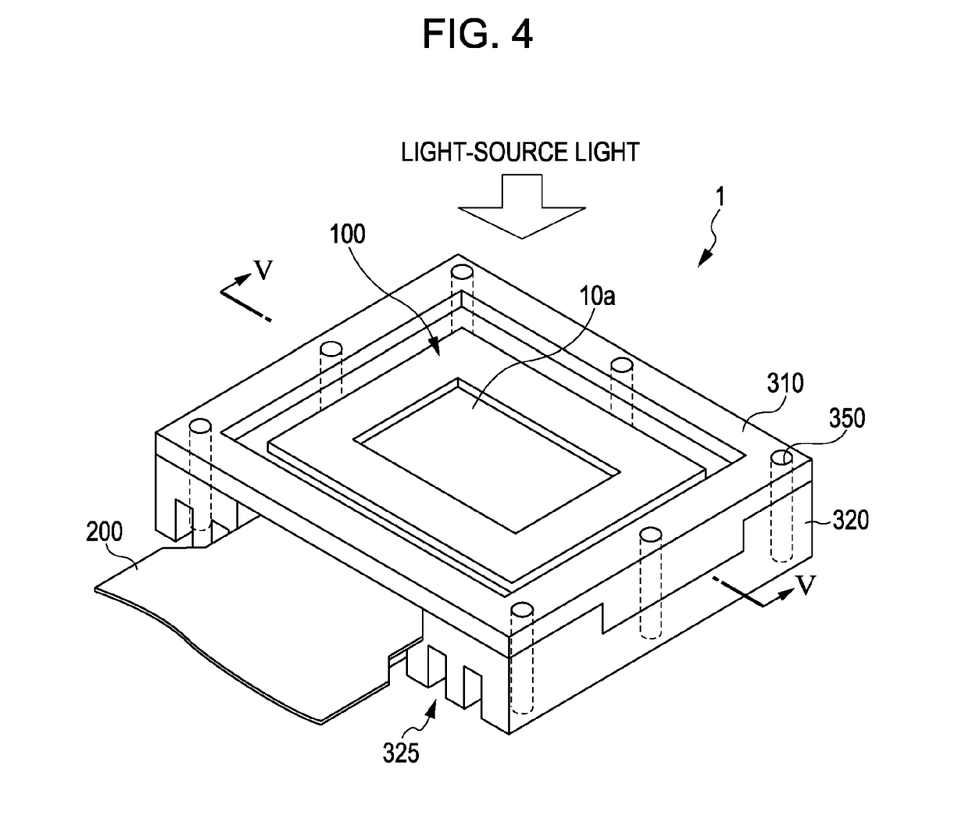
FIG. 4 is a perspective view showing the overall configuration of the electro-optical device related to the first embodiment.
Figure 5:
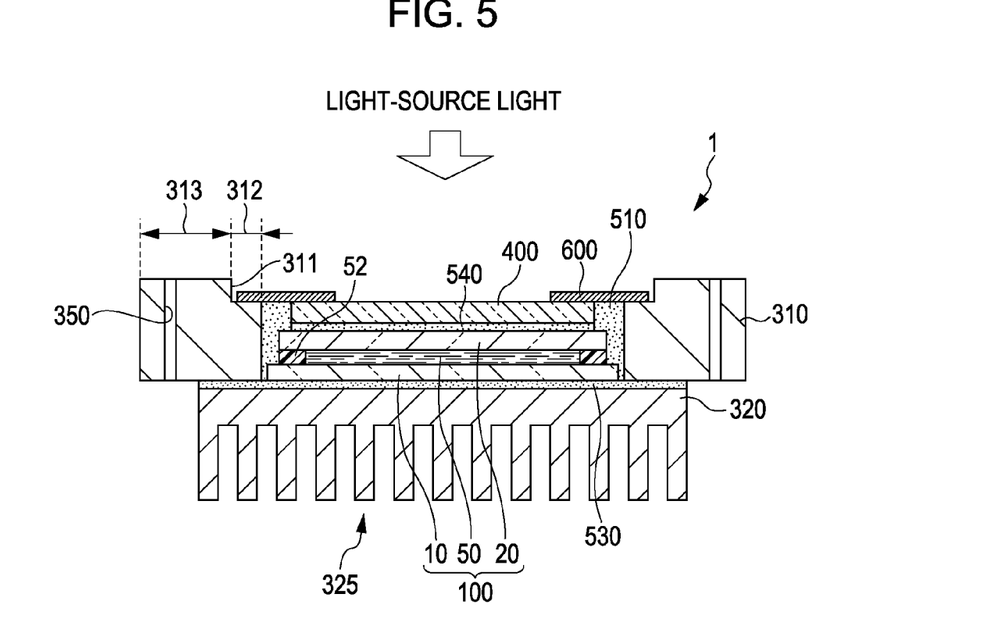
FIG. 5 is a cross-sectional view showing the concrete configuration of the electro-optical device related to the first embodiment.

Next, the overall configuration of the electro-optical device related to this embodiment will be described with reference to FIG. 4. Here, FIG. 4 is a perspective view showing the overall configuration of an electro-optical device 1 related to this embodiment. FIG. 5 is a cross-sectional view taken along line V-V of FIG. 4. Also, in FIG. 4 and the drawings thereafter, illustration is made with the detailed members in the liquid crystal panel 100 shown in FIGS. 1 and 2 appropriately omitted.

The electro-optical device related to this embodiment is constituted to include the liquid crystal panel 100, a flexible substrate 200, a frame 310, a heat sink 320, and a parting plate 600. Also, the frame 310 is one example of a "holding member" related to the disclosure and the heat sink 320 is one example of a "heat radiation member" related to the disclosure. The liquid crystal panel 100 is housed by being held by the frame 310 from the side face side thereof and also being held so as to be sandwiched between the heat sink 320 and the parting plate 600 from the up-and-down direction.

Although illustration is omitted in FIGS. 4 and 5, the flexible substrate 200 is joined to the external circuit connection terminal 102 of the liquid crystal panel 100. The flexible substrate 200 is a substrate which includes signal wirings for sending various control signals, which are required for an electro-optical operation of the above-described liquid crystal panel 100, and is formed by patterning the signal wirings and the like in a base material such as polyimide, for example. Also, an IC chip for driving, which includes at least a portion of the driving circuits for driving the liquid crystal panel 100, or the like may be disposed on the flexible substrate 200. Also, the other end on the opposite side to one end of the flexible substrate 200 which is connected to the liquid crystal panel 100 is drawn out to the outside of the frame 310 and the heat sink 320 and connected to an external circuit (not shown) for supplying various control signals which are required for the electro-optical operation of the liquid crystal panel 100.

The frame 310 holds the liquid crystal panel 100 from the side face side. The frame 310 is constituted to include metal having excellent thermal conductivity, such as iron, copper, aluminum, or magnesium, for example, and performs heat radiation of the liquid crystal panel 100 along with the heat sink 320 which will be described below.

The heat sink 320 holds the liquid crystal panel 100 from the back surface side located at the opposite side to the display face. The heat sink 320 has a heat radiation section 325 for radiating heat generated in the liquid crystal panel 100. Accordingly, it is possible to prevent generation of various defects such as an operation defect of the liquid crystal panel 100 due to accumulation of heat in the liquid crystal panel 100. Also, stress which is generated in the device can be reduced by reducing the strain in a constituent member of the electro-optical device 1 due to heat. In at least one embodiment, the heat sink 320 is constituted to include a material having high thermal conductivity, for example, iron, copper, aluminum, or the like in order to increase a heat radiation effect.

The frame 310 and the liquid crystal panel 100 are bonded to the heat sink 320 by an adhesive agent 530. Also, the frame 310 and the heat sink 320 may be joined to each other at a joining portion (not shown). In this case, the joining may be performed, for example, by fitting a convex portion provided at the heat sink into a concave portion provided at the frame 310 or may be performed by using a screw or the like. The adhesive agent 530 has higher thermal conductivity than air, can efficiently transmit heat generated at the liquid crystal panel 100 to the heat sink 320, and has a function of increasing the heat radiation effect in the heat radiation section 325.

Also, in this embodiment, the adhesive agent 530 is applied so as to fill the gap between the liquid crystal panel 100 and the heat sink 320 and the gap between the frame 310 and the heat sink 320. However, the adhesive agent 530 may be applied only to a portion of each gap and the adhesive agent 530 need not be applied between the liquid crystal panel 100 and the heat sink 320 and between the frame 310 and the heat sink 320. Also, in place of or in addition to the adhesive agent 530, a sheet, grease, or the like, which has thermal conductivity, may be used.

A step 311 is provided at the side (hereinafter appropriately referred to as a "display face side") of the frame 310, which incident light enters. An area located further inside than the step 311 is formed so as to be concave compared to an area located further outside than the step 311. In the following explanation, the concave area which is present further inside than the step 311 is appropriately referred to as a "concave portion 312" and also the area which is present further outside than the step 311 is appropriately referred to as an "attaching portion 313".

The parting plate 600 is mounted on the concave portion 312 in the frame 310. The parting plate 600 is one example of a "light-shielding plate" related to the disclosure and is provided in a window shape so as to surround the image display area 10a of the liquid crystal panel 100, as shown in FIG. 4, thereby preventing the incidence of light on areas other than the image display area 10a. The parting plate 600 is formed by a material having a low optical reflectance compared to another member constituting the electro-optical device 1, such as the frame 310, for example. Specifically, in at least one embodiment, the parting plate is formed, for example, by SUS304 which is a typical steel grade of austenitic stainless steel. The parting plate 600 is engaged with the frame 310 at an engagement portion (not shown).

A plurality of threaded holes 350 is provided at the attaching portion 313 of the frame 310. A bolt can pass through the threaded hole 350, and the frame 310 can be fixed to an external member by tightening the bolts.

An adhesive agent 510 is filled between the liquid crystal panel 100 and the frame 310, whereby the liquid crystal panel 100 and the frame 310 are bonded to each other.

A dust-proof substrate 400 is bonded to a face of the side which does not face the TFT array substrate 10, in the counter substrate 20 constituting the liquid crystal panel 100, by a transparent adhesive agent 540. The dust-proof substrate 400 has a function of protecting the image display area 10a of the liquid crystal panel 100 from dust or dirt.

Figure 6:
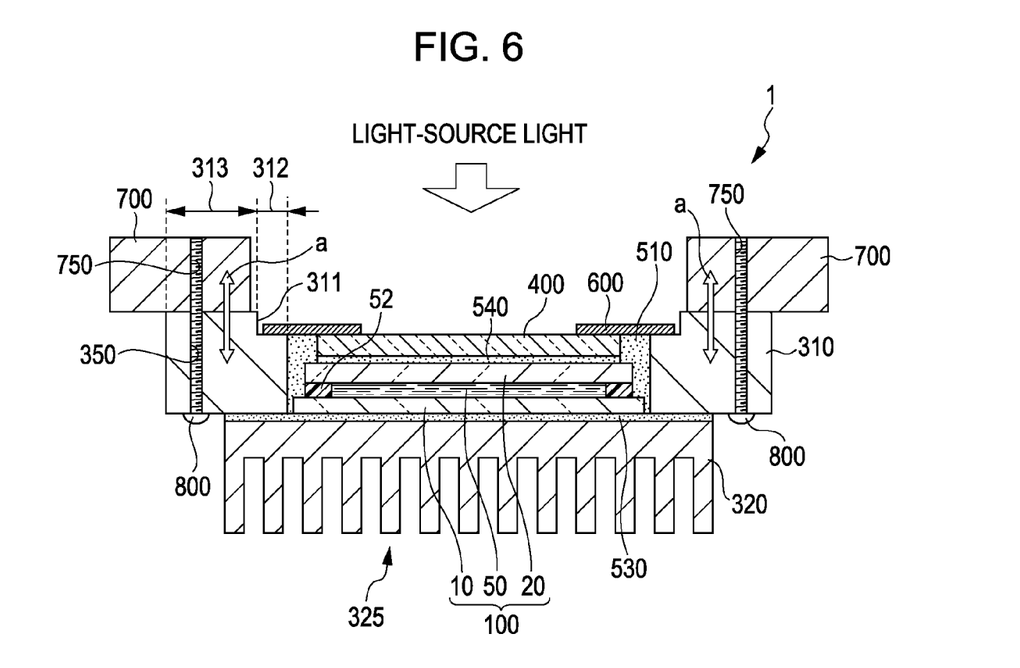
FIG. 6 is a cross-sectional view schematically showing stress which is generated in the electro-optical device related to the first embodiment.

Here, referring to FIG. 6, an explanation is made of stress which is generated in the electro-optical device 1 related to this embodiment in a case where the attaching portion 313 of the frame 310 has been attached to an external member 700. FIG. 6 is a cross-sectional view schematically showing stress which is generated in the electro-optical device 1 related to this embodiment in a case where the attaching portion 313 of the frame 310 has been attached to the external member 700.

Also, the external member 700 is one example of a "mounted member" related to the disclosure and specifically, is a jig member for attaching to an inner wall of a liquid crystal projector when the electro-optical device 1 related to the disclosure is attached as a light valve to the liquid crystal projector which will be described in detail later as an electronic apparatus which is provided with the electro-optical device 1.

The frame 310 is disposed such that the threaded holes 350 provided at the frame 310 correspond to threaded holes 750 provided at the external member 700, and bolts 800 are inserted so as to pass through the threaded holes 350 and the threaded holes 750 and then tightened, whereby the attaching portion 313 of the frame 310 is fixed to the external member 700. Also, threads (not shown) are cut in the surface of the bolt 800, and the bolt 800 is tightened by rotating the bolt 800 with use of a screw driver or the like, so that the frame 310 can be tightly fixed to the external member 700.

If the bolts 800 are tightened, stress is generated in the inside of the electro-optical device 1. In FIG. 6, one example of stress being generated in the frame 310 is schematically shown by a white arrow a. Stress generated in the frame 310 in this manner is transmitted to the liquid crystal panel 100 through each member disposed between the frame 310 and the liquid crystal panel 100.

In this embodiment, in particular, the parting plate 600 comes into contact with the liquid crystal panel 100 from the display face side, whereby the liquid crystal panel 100 is held. For this reason, stress generated in the frame 310 is transmitted to the liquid crystal panel 100 through the parting plate 600. Since the parting plate 600 is formed into a thin-plate shape, if a force acts thereon, the parting plate 600 can be considerably distorted in the up-and-down direction (that is, the parting plate 600 has elasticity). Therefore, stress which is transmitted from the frame 310 through the parting plate 600 is absorbed by the elasticity of the parting plate 600. As a result, stress which is transmitted from the frame 310 to the liquid crystal panel 100 is reduced.

Also, an example is shown in which the bolts 800 are inserted into the threaded holes 350 and 750, whereby the fixing to the external member 700 is performed. However, further, in order to reduce the stress which is transmitted from the frame 310 to the liquid crystal panel 100, the attaching portion 313 of the frame 310 and the external member 700 may be fixed and bonded to each other through an adhesive agent without providing the threaded holes 350. Also, a configuration is acceptable in which among the attaching portions 313 of the four corners of the frame 310, two diagonally opposite attaching portions 313 are fixed by inserting the bolts 800 into the threaded holes 350 and 750 and the remaining two diagonally opposite attaching portions 313 are fixed and bonded to the external member 700 through an adhesive agent.

Figure 7:
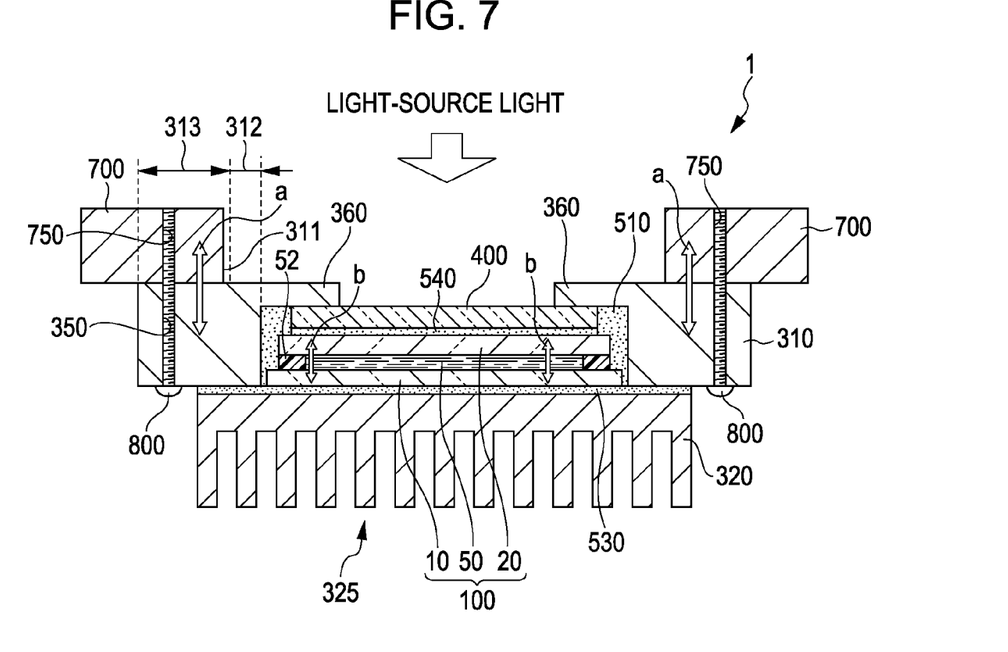
FIG. 7 is a cross-sectional view schematically showing stress which is generated in an electro-optical device related to an existing example.

Here, FIG. 7 is a cross-sectional view showing a cross section of an electro-optical device related to an existing example in which the liquid crystal panel 100 is held away from the display face side by an extending portion 360 formed so as to extend from the frame 310. In the existing example, the extending portion 360 is formed integrally with the frame 310. For this reason, the extending portion 360 is not allowed to be distorted in the up-and-down direction like the parting plate 600 in this embodiment, so that the extending portion 360 cannot absorb stress which is generated in the frame 310. Therefore, in the existing example, stress which occurs when attaching the frame 310 to the external member 700 is directly transmitted to the liquid crystal panel 100 (refer to a white arrow b in FIG. 7), thereby causing a change in the gap between substrates in the liquid crystal panel 100, so that color unevenness occurs in a display image.

On the other hand, in this embodiment, since stress which is generated in the electro-optical device is absorbed by the parting plate 600, stress which is transmitted to the liquid crystal panel 100 is reduced. Therefore, the gap between substrates in the liquid crystal panel 100 is kept unchanged, so that generation of color unevenness in a display image can be prevented.

Second Embodiment

Figure 8:
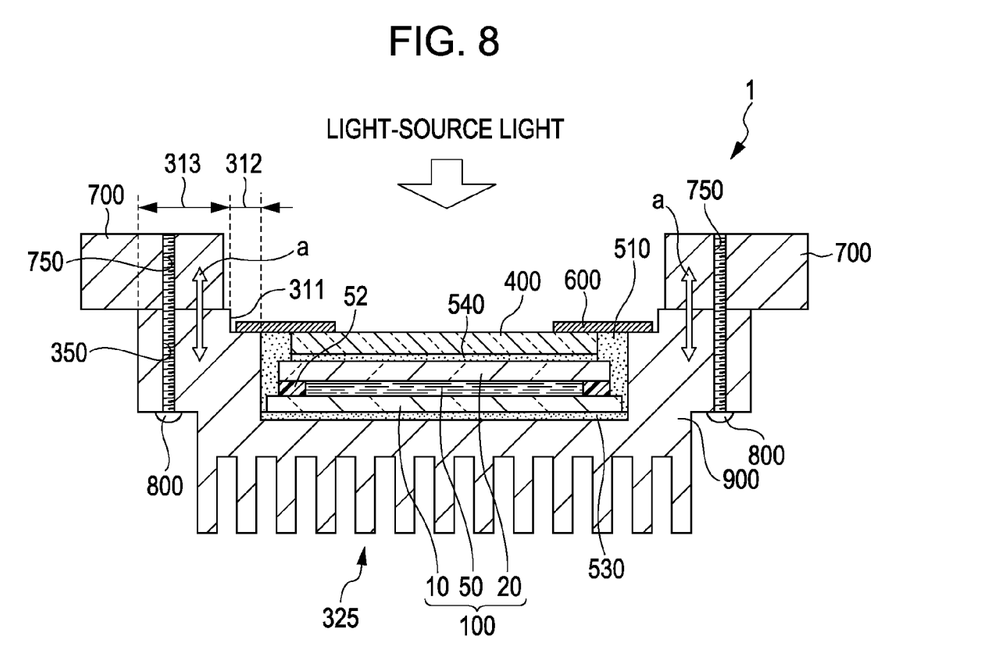
FIG. 8 is a cross-sectional view of an electro-optical device related to a second embodiment.

Hereafter, an electro-optical device related to a second embodiment will be described with reference to FIG. 8. FIG. 8 is a cross-sectional view of the electro-optical device related to this embodiment. Also, in the electro-optical device related to this embodiment, with respect to common portions to those of the electro-optical device 1 related to the first embodiment described above, common symbols are applied and the detailed explanation thereof is omitted.

In this embodiment, a heat radiation frame 900 holds the liquid crystal panel 100 and also functions as a heat radiation member. That is, the heat radiation frame 900 is equivalent to a member in which the frame 310 and the heat sink 320 in the first embodiment are integrally formed, and is one example of the "holding member" and the "heat radiation member" related to the disclosure. In this manner, the frame 310 and the heat sink 320 are integrally formed, so that the degree of rigidity of the entire electro-optical device is improved. For this reason, even in a case where the bolts 800 are tightened, it is difficult for stress to occur in the inside of the electro-optical device 1. Therefore, stress which is transmitted to the liquid crystal panel 100 is also reduced, so that generation of color unevenness in a display image can be more effectively suppressed.

Third Embodiment

Figure 9:
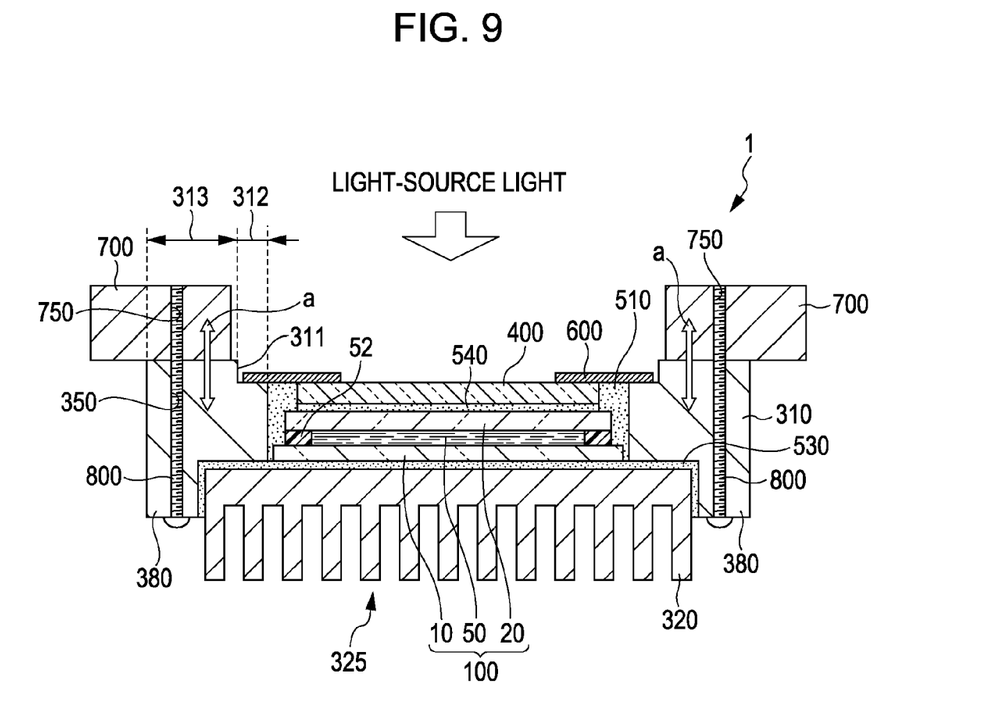
FIG. 9 is a cross-sectional view of an electro-optical device related to a third embodiment.

Hereafter, an electro-optical device related to a third embodiment will be described with reference to FIG. 9. FIG. 9 is a cross-sectional view of the electro-optical device related to this embodiment. Also, in the electro-optical device related to this embodiment, with respect to common portions to those of the electro-optical device 1 related to the first embodiment described above, common symbols are applied and the detailed explanation thereof is omitted.

In this embodiment, an extending portion 380 is provided at the frame 310 such that a length along the bolt 800 in the frame 310 is increased. By providing the extending portion 380 in this manner, it is possible to increase the degree of rigidity of the frame 310. For this reason, even in a case where the bolts 800 are tightened, it is difficult for stress to occur in the inside of the electro-optical device 1. Therefore, stress which is transmitted to the liquid crystal panel 100 is also reduced, so that generation of color unevenness in a display image can be more effectively suppressed.

Fourth Embodiment

Figure 10:
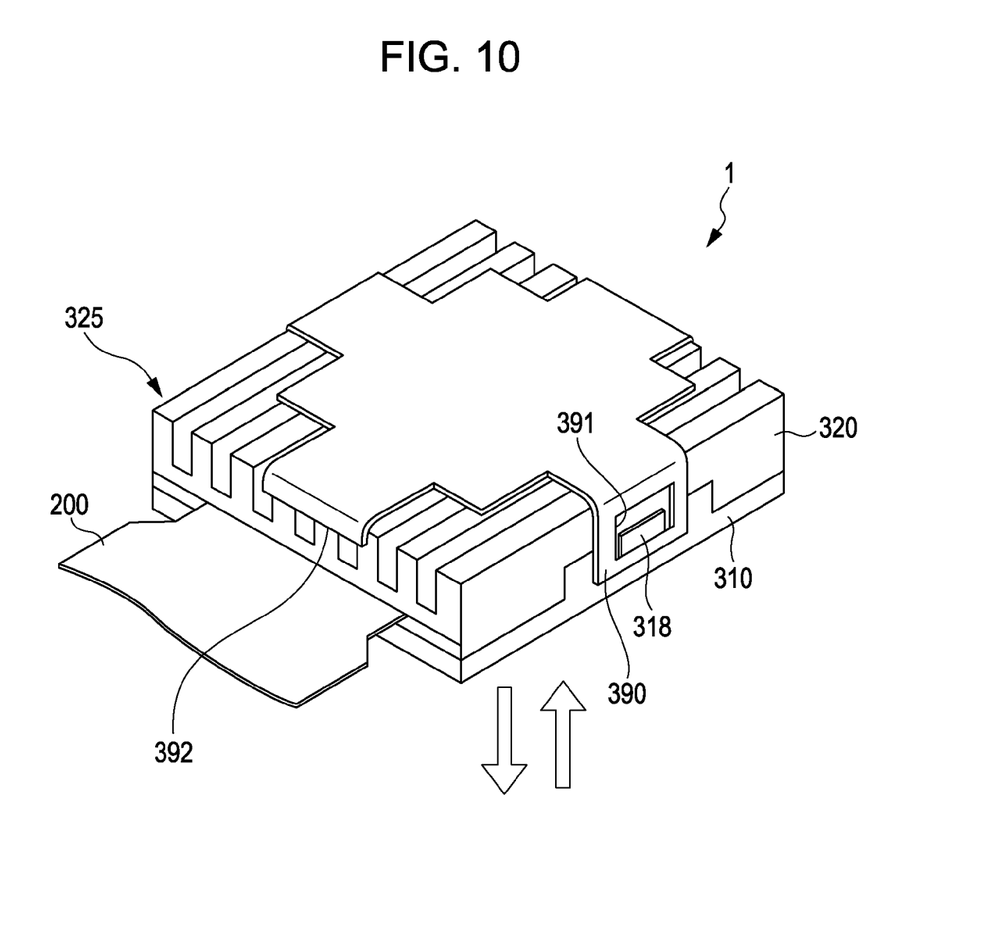
FIG. 10 is a perspective view showing the overall configuration of an electro-optical device related to a fourth embodiment.

Hereafter, an electro-optical device related to a fourth embodiment will be described with reference to FIG. 10. FIG. 10 is a perspective view showing the overall configuration of the electro-optical device related to this embodiment. Also, in the electro-optical device related to this embodiment, with respect to common portions to those of the electro-optical device 1 related to the first embodiment described above, common symbols are applied and the detailed explanation thereof is omitted.

This embodiment is different from the above-described respective embodiments in that the heat sink 320 is attached to the frame 310 by using a hook 390. The hook 390 is one example of a "hook member" related to the disclosure. By fixing the hook 390 such that opening portions 391 provided at side faces thereof are engaged with convex portions 318 provided at the frame 310, the frame 310 and the heat sink 320 are fixed to each other. Also, the hook 390 has support portions 392 for stabilizing a position of the heat sink 320 attached to the frame 310.

Each embodiment described above has a structure in which since the heat sink 320 is rigidly fixed to the frame 310 by the adhesive agent 350, stress generated in the frame 310 and the heat sink 320 is easily transmitted to the liquid crystal panel 100. On the other hand, in this embodiment, for example, since the heat sink 320 is fixed by hooking the hook 390 on the frame 310, stress which is generated is minor. That is, by performing the fixing by the hook 390, it is difficult for a strain to occur in the frame 310 and the heat sink 320, so that generation of stress can be effectively prevented.

Also, since the hook 390 is provided at the opposite side to the display face of the liquid crystal panel 100, the incident light on the image display area 10a of the liquid crystal panel 100 is not blocked. For this reason, it is possible to fix the heat sink 320 to the frame 310 in an efficient layout without interfering with the display of the liquid crystal panel 100.

Electronic Apparatuses

Figure 11:
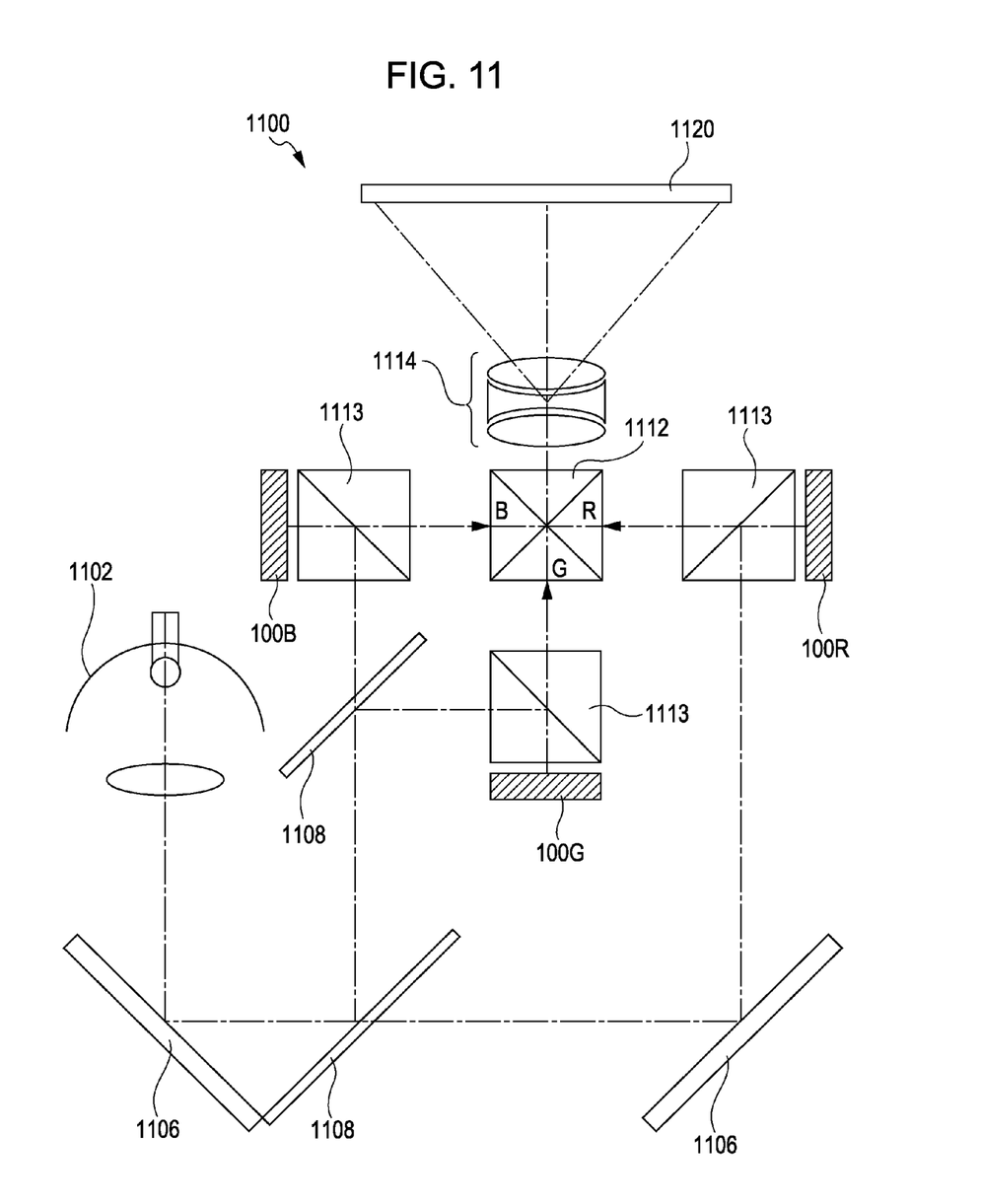
FIG. 11 is a plan view showing the configuration of a projector as one example of an electronic apparatus with an electro-optical device applied thereto.

Next, an explanation will be made of the case of applying the liquid crystal device which is the above-described electro-optical device to various electronic apparatuses. Here, a projection type liquid crystal projector is taken as an example of the electronic apparatus according to the disclosure. FIG. 11 is a schematic cross-sectional view of the projection type liquid crystal projector related to this embodiment.

In FIG. 11, a liquid crystal projector 1100 related to this embodiment is built as a multiple-plate type color projector using three pieces of liquid crystal light valves 100R, 100G, and 100B for R, G, and B, respectively. In each of the liquid crystal light valves 100R, 100G, and 100B, the above-described reflection type liquid crystal device is used.

As shown in FIG. 11, in the liquid crystal projector 1100, if projection light is emitted from a lamp unit 1102 which is a white light source such as a metal halide lamp, the light is divided into optic elements R. G. and B corresponding to the three primary colors, R, G, and B, by two pieces of mirrors 1106, two pieces of dichroic mirrors 1108, and three pieces of polarization beam splitters (PBS) 1113 and the optic elements are respectively conducted to the liquid crystal light valves 100R, 100G, and 100B corresponding to the respective colors. Also, at this time, in order to prevent light losses in optical paths, a lens may be appropriately provided in the middle of each optical path. Then, the optic elements corresponding to the three primary colors respectively modulated by the liquid crystal light valves 100R, 100G, and 100B are combined by a cross prism 1112 and then projected as a color picture to a screen 1120 through a projection lens 1114.

Also, since light corresponding to the respective primary colors, R, G, and B, enters into the liquid crystal light valves 100R, 100G, and 100B by the dichroic mirrors 1108 and the polarization beam splitters 1113, there is no need to provide color filters.

Besides the electronic apparatus described with reference to FIG. 11, a mobile personal computer, a mobile telephone, a liquid crystal television, a viewfinder type and a monitor direct view type video tape recorders, a car navigation device, a pager, an electronic notebook, an electronic calculator, a word processor, a workstation, a television telephone, a POS terminal, a device provided with a touch panel, and the like can be given. Also, it goes without saying that the electro-optical device according to the disclosure can be applied to these various electronic apparatuses.

The disclosure can also be applied to a transmission type liquid crystal device, a plasma display (PDP), an electrolysis emission type display (FED or SED), an organic EL display, a digital micromirror device (DMD), an electrophoretic device, and the like, besides the reflection type liquid crystal device described in the above-described embodiments.

The disclosure is not limited to the embodiments described above and can be appropriately changed within the scope which is not contrary to the gist or the idea of the disclosure which can be read from the claims and the entire specification, and electro-optical devices with such changes and electronic apparatuses provided with the electro-optical devices are also included in the technical scope of the disclosure.

What is claimed is:

1. An electro-optical device comprising:
   an electro-optical panel including a display area, the electro-optical panel having an incidence face side that faces incident light from a light source and an opposite side which is opposite to the incidence face side;
   a holding member which houses the electro-optical panel;
   a heat radiation member provided at the opposite side of the electro-optical panel; and
   a light-shielding plate formed so as to at least partially surround the display area of the electro-optical panel and provided so as to make contact with the holding member and the incidence face side of the electro-optical panel.

2. The electro-optical device according to claim 1, wherein the holding member includes an attaching portion and a concave portion, the attaching portion formed so as to protrude toward a mounted member side and away from the light-shielding plate, and the concave portion provided so as to be concave as compared to the attaching portion, and
   the light-shielding plate is disposed so as to come into contact with the concave portion.

3. The electro-optical device according to claim 1, further comprising a hook member extending from a back side of the heat radiation member toward the electro-optical panel, the hook member fixing the heat radiation member to the holding member.

4. The electro-optical device according to claim 1, wherein an opening portion of the light-shielding plate is formed inside an opening portion of the holding member as viewed from the incidence face side.

5. The electro-optical device according to claim 1, wherein the light-shielding plate has elasticity.

6. The electro-optical device according to claim 1, wherein the heat radiation member is formed integrally with the holding member.

7. The electro-optical device according to claim 1, wherein the holding member further includes an extending portion formed integrally with the holding member, the extending portion extending beyond a front side of the heat radiation member and toward a back side of the heat radiation member.

8. The electro-optical device according to claim 3, wherein the hook member includes an opening portion and the holding member includes a convex portion, and the heat radiation member and the holding member are fixed to each other by the opening portion being engaged with the convex portion.

9. An electronic apparatus comprising the electro-optical device according to claim 1.

10. The electro-optical device according to claim 9, wherein the electronic apparatus is a liquid crystal projector.

* * * * *